(12) United States Patent
Melander et al.

(10) Patent No.: US 12,098,505 B2
(45) Date of Patent: Sep. 24, 2024

(54) SYSTEM FOR TREATMENT OF A BIOMASS MATERIAL

(71) Applicant: VALMET AB, Sundsvall (SE)

(72) Inventors: Olof Melander, Sundsvall (SE); Patrik Pettersson, Alnö (SE); Johan Carlsson, Alnö (SE)

(73) Assignee: VALMET AB, Sundsvall (SE)

( * ) Notice: Subject to any disclaimer, the term of this patent is extended or adjusted under 35 U.S.C. 154(b) by 748 days.

(21) Appl. No.: 17/050,013

(22) PCT Filed: Mar. 22, 2019

(86) PCT No.: PCT/SE2019/050256
§ 371 (c)(1),
(2) Date: Oct. 23, 2020

(87) PCT Pub. No.: WO2019/212396
PCT Pub. Date: Nov. 7, 2019

(65) Prior Publication Data
US 2021/0095420 A1 Apr. 1, 2021

(30) Foreign Application Priority Data
May 3, 2018 (SE) .................................... 1850529-7

(51) Int. Cl.
*D21B 1/36* (2006.01)
*D21C 1/02* (2006.01)
(Continued)

(52) U.S. Cl.
CPC .................. *D21B 1/36* (2013.01); *D21C 1/02* (2013.01); *D21C 7/06* (2013.01); *D21C 7/08* (2013.01); *D21C 7/10* (2013.01)

(58) Field of Classification Search
CPC ............. D21C 7/06; D21C 7/08; D21C 11/10
See application file for complete search history.

(56) References Cited

U.S. PATENT DOCUMENTS 2,882,967 A 4/1959 Surino
3,362,868 A * 1/1968 Ernst .................. D21C 11/0057
423/206.1
(Continued)

FOREIGN PATENT DOCUMENTS

EP 3088529 A1 11/2016
RU 1815451 C 5/1993
(Continued)

OTHER PUBLICATIONS

Gullichsen editor, Chemical Pulping 6A, 1999, Fapet Oy, pg. A536-A539 (Year: 1999).*
(Continued)

*Primary Examiner* — Anthony Calandra
(74) *Attorney, Agent, or Firm* — Foley & Lardner LLP

(57) ABSTRACT

A system for treatment of a biomass material and a method for transporting biomass material, said system comprising: —a first vessel (3) in which said biomass material is treated at a first pressure;—a second vessel (5) in which said biomass material is collected at a second pressure which is lower than the first pressure; and—a transporting pipe (7) connecting an outlet (9) of the first vessel (3) with an inlet (11) of the second vessel (5) for transporting the biomass material from the first vessel to the second vessel, wherein said transporting pipe (7) comprises at least one restriction (13) for control of the flow in the transporting pipe and hereby providing a pressure drop to the transported biomass material, wherein at least one of said at least one restriction (13) is provided somewhere in the second half of the length of the transporting pipe (7) starting from the first vessel (3) and ending at the second vessel (5).

12 Claims, 2 Drawing Sheets

(51) Int. Cl.
*D21C 7/06* (2006.01)
*D21C 7/08* (2006.01)
*D21C 7/10* (2006.01)

(56) References Cited

U.S. PATENT DOCUMENTS

| | | | |
|---|---|---|---|
| 3,397,110 A | 8/1968 | Rosenblad | |
| 8,366,802 B2 * | 2/2013 | Olsson | B01D 19/0063 |
| | | | 95/1 |
| 9,856,601 B2 * | 1/2018 | Stromberg | C12M 45/02 |
| 11,674,264 B2 * | 6/2023 | Pettersson | D21C 1/02 |
| | | | 422/162 |
| 2009/0221814 A1 | 9/2009 | Pschorn et al. | |
| 2011/0079219 A1 | 4/2011 | McDonald et al. | |
| 2013/0206346 A1 * | 8/2013 | Hunt | D21C 7/10 |
| | | | 162/29 |
| 2014/0352900 A1 * | 12/2014 | Grogan | D21C 11/00 |
| | | | 162/29 |
| 2015/0198187 A1 | 7/2015 | Goodwin et al. | |
| 2016/0312319 A1 * | 10/2016 | Kusuda | B01F 27/1921 |

FOREIGN PATENT DOCUMENTS

| | | |
|---|---|---|
| WO | WO 2010/085839 A1 | 8/2010 |
| WO | WO-2012/080579 A1 | 6/2012 |
| WO | WO 2015/199601 A1 | 12/2015 |
| WO | WO 2017/136915 A1 | 8/2017 |

OTHER PUBLICATIONS

Extended European Search Report, Application No. 19797146.8, Dec. 23, 2021, 9 pages.
Swedish Office Action, Patent Application No. 1850529-7, Dec. 3, 2018, 5 pages.

* cited by examiner

SYSTEM FOR TREATMENT OF A BIOMASS MATERIAL

TECHNICAL FIELD OF THE INVENTION

The present invention relates to a system for treatment of a biomass material. It further relates to a transporting pipe, a gas separation device, a diffuser and to a method for transporting a biomass material from a first vessel to a second vessel.

BACKGROUND

Arrangements for pretreatment or prehydrolysis of biomass are known in the art. Such arrangement may comprise one or more pressurized reactors in which the biomass is pretreated with steam at elevated pressure and temperature with or without the addition of chemicals.

Temperature and time are two important parameters in such a prehydrolysis treatment. In particular, it is preferable that the desired temperature is reached as fast as possible in order to avoid building an excessively large reactor. It is furthermore important that the heating of the biomass is as homogenous as possible, since a heterogeneous heating may lead to unreacted, low-reacted or even over-reacted material, which in turn may cause yield loss, formation of undesired by-products and/or problems in the downstream process.

Typically, biomass material is treated with steam under pressure in a reactor and then transferred to a steam separation device, e.g. a cyclone, through a transporting pipe, often called a blow line. The cyclone can be pressurized or working at or below atmospheric pressure. However, the cyclone will be at a lower pressure than the reactor. A valve, often called a blow valve, is usually provided close to the outlet from the reactor in the blow line. Said blow valve is provided for controlling the flow through the transporting pipe. The blow valve will hereby provide a pressure drop to the biomass which is transported through the transporting pipe (blow line) from the reactor to the cyclone. There are several established ways of discharging material from pretreatment reactors, e.g. steam explosion (steam and moist particles in the flow) and dilution discharge (liquid and particles in the flow) or combinations of these two methods. The highest velocity in the blow line is typically obtained with a steam explosion discharge. Particles (biomass, sand or other impurities) which are travelling at high speed in the blow line will cause the blow line to erode. Erosion of the blow line (transporting pipe) is a severe problem. Blow lines need to be changed or repaired frequently due to this. Especially at bends, elbows, and junctions of the blow line, severe erosion may occur. A common way to handle this problem is to minimize the number of bends, to have large radius of the bends or to use wear-resistant liners in the bends.

SUMMARY

An object of the invention is to provide an improved system and method for the treatment of a biomass material.

A further object of the invention is to increase the life time of a transporting pipe provided in such a system.

This is achieved by a system, a transporting pipe, a method, a gas separation system and a diffuser according to the independent claims.

According to one aspect of the invention a system is provided for treatment of a biomass material, said system comprising:
 a first vessel in which said biomass material is treated at a first pressure;
 a second vessel in which said biomass material is collected at a second pressure which is lower than the first pressure; and
 a transporting pipe connecting an outlet of the first vessel with an inlet of the second vessel for transporting the biomass material from the first vessel to the second vessel,
wherein said transporting pipe comprises at least one restriction for control of the flow in the transporting pipe and hereby providing a pressure drop to the transported biomass material, wherein at least one of said at least one restriction is provided somewhere in the second half of the length of the transporting pipe starting from the first vessel and ending at the second vessel.

According to another aspect of the invention, a transporting pipe configured for connecting an outlet of a first vessel with an inlet of a second vessel in a system for treatment of a biomass material is provided, said first vessel being a vessel in which said biomass material is treated at a first pressure and said second vessel is a vessel in which said biomass material is collected at a second pressure which is lower than the first pressure, wherein said transporting pipe comprises at least one restriction for control of the flow in the transporting pipe hereby providing a pressure drop to the transported biomass material, wherein at least one of said at least one restriction is provided somewhere in the second half of the length of the transporting pipe starting from the first vessel and ending at the second vessel.

According to another aspect of the invention, a method is provided for transporting a biomass material from a first vessel where said biomass material is treated at a first pressure to a second vessel in which said biomass material is collected at a second pressure which is lower than the first pressure, wherein said method comprises the steps of:
 connecting an outlet of the first vessel with an inlet of the second vessel by a transporting pipe;
 providing at least one restriction in the transporting pipe for control of the flow in the transporting pipe hereby providing a pressure drop to the transported biomass material, wherein at least one of said at least one restriction is provided somewhere in the second half of the length of the transporting pipe starting from the first vessel and ending at the second vessel; and
 transporting the biomass material from the first vessel to the second vessel through the transporting pipe.

According to another aspect of the invention a gas separation system is provided comprising a gas separation device, a diffuser connected to an inlet of the gas separation vessel and a restriction provided to the diffuser and arranged for connecting to a transporting pipe which is connecting a pressurized reactor to the gas separation system, wherein said restriction is configured for control of a flow of a biomass material entering the gas separation system from the transporting pipe hereby providing a pressure drop to the transported biomass material.

According to another aspect of the invention a diffuser is provided configured for connecting an inlet of a second vessel with a transport pipe which is transporting biomass material from a first vessel where said biomass material is treated at a first pressure to the second vessel where said biomass material is collected at a second pressure which is lower than said first pressure, wherein said diffuser comprises a restriction which is configured for control of a flow of the biomass material entering the second vessel from the transporting pipe hereby providing a pressure drop to the transported biomass material.

Hereby, by providing a restriction in a second half of the transporting pipe, part of the pressure drop provided in the transporting pipe from the first vessel to the second vessel will be moved to the second half of the transporting pipe. In prior art solutions a very large portion of the pressure drop usually occurs at the position of a blow valve in direct connection to the first vessel. The gas expansion associated with the pressure drop will cause a high velocity of the gas and particles throughout the whole transporting pipe. By moving part of the pressure drop to a second half of the transporting pipe the flow speed upstream of the restriction will be lowered and hereby erosion of the transporting pipe will be decreased and the life time of the transporting pipe will be increased. If the restriction is provided after bends of the transporting pipe life time of the transporting pipe can be increased greatly because erosion is especially severe at the position of bends.

In one embodiment of the invention, at least one of said at least one restriction is provided somewhere in the last 25% or last 10% of the length of the transporting pipe starting from the first vessel and ending at the second vessel.

In one embodiment of the invention, at least one of said at least one restriction is provided after a majority of bends, elbows and junctions provided in the transporting pipe from the first vessel to the second vessel. Hereby problems with erosion close to bends, elbows and junctions can be decreased.

In one embodiment of the invention, the first vessel is a reactor for pretreatment of a biomass material with steam or other heating media under a pressure of at least 5 bar(g) and a temperature of at least 130° C. and the second vessel is a tank or a gas separation device.

In one embodiment of the invention, at least one of said at least one restriction is a fixed orifice plate or a control valve by which a degree of flow restriction can be controlled.

In one embodiment of the invention, at least two restrictions are provided whereof a first restriction is provided somewhere in the second half of the length of the transporting pipe starting from the first vessel and ending at the second vessel and a second restriction is provided as a valve in connection with the outlet of the first vessel.

Further embodiments are described in the dependent claims and in the detailed description.

DETAILED DESCRIPTION OF EMBODIMENTS

As discussed above in the background chapter biomass material can be treated by steam at elevated pressure and temperature in a reactor as a step in a process for production of for example sugars, bioethanol, steam exploded pellets or various chemicals. The biomass material can be for example wood in different forms (wood chips, saw dust, splinters, etc), wheat straw, rice straw, bagasse, corn stover, energy cane, empty fruit bunches, different kinds of grass material or similar biomass materials.

Examples of treatment of biomass are autohydrolysis or acid-catalyzed hydrolysis followed by steam explosion discharge, dilution discharge or combinations of these as described in the background. These methods differ by the content of liquid or water in the biomass material.

Figure 1:
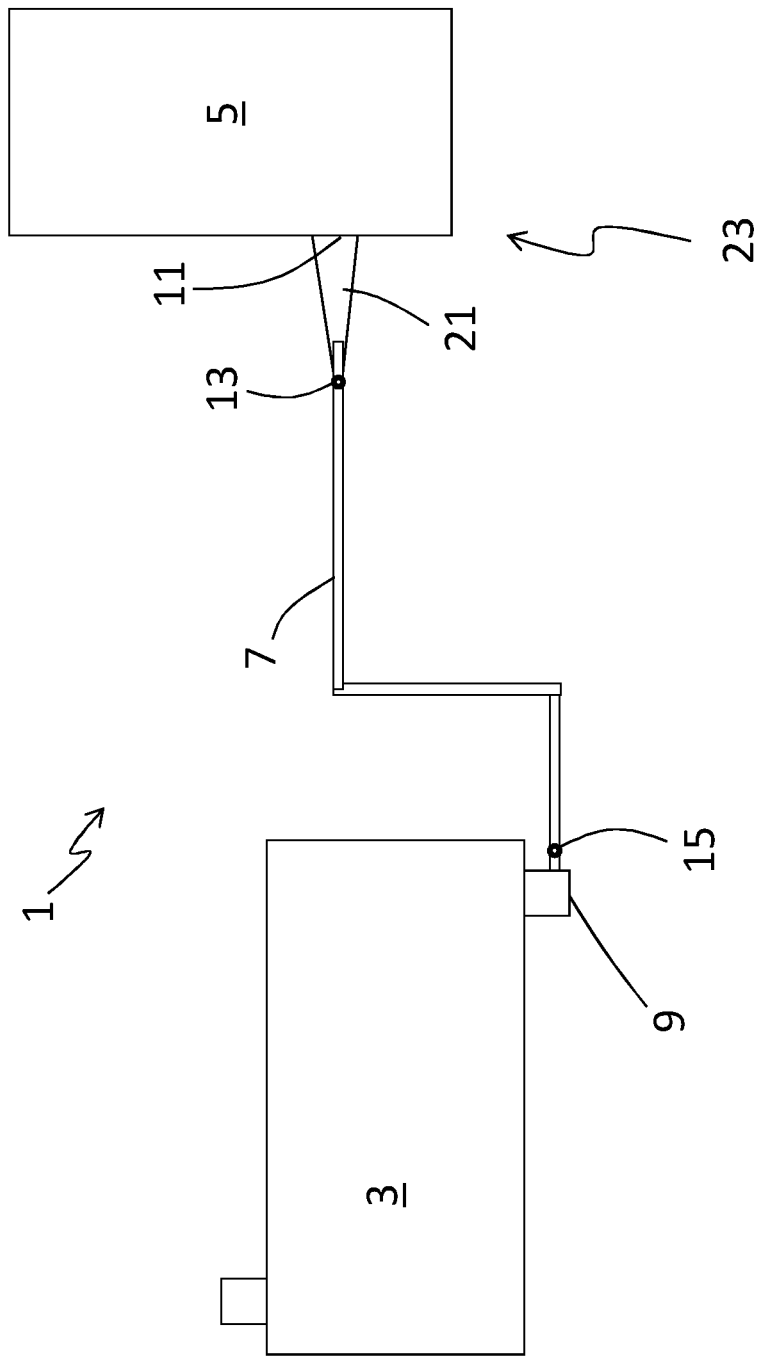
FIG. 1 shows schematically a system for treatment of a biomass material according to one embodiment of the invention.

In FIG. 1 a system 1 for treatment of a biomass material according to one embodiment of the invention is shown schematically. Said system comprises a first vessel 3 in which said biomass material is treated at a first pressure. Said first vessel can for example be a reactor or a refiner and can be used for pretreatment of biomass material at elevated pressure and temperature for example by steam. If the first vessel is a refiner, it is usually connected to a reactor at an inlet of the refiner. The first vessel can comprise a discharger provided at an outlet of the first vessel. The pressure in the first vessel can typically be in the range 5-30 bar(g), but significantly higher pressures are also used in these systems. The temperature in the first vessel can typically be in the range of 130-250° C. The system comprises further a second vessel 5 in which said biomass material is collected at a second pressure which is lower than the first pressure. The second vessel can be a tank or a separation device, such as a gas separation device which is separating gas from solids and/or liquid, e.g. a cyclone or a mechanical separator. The second vessel 5 can be a pressurized vessel or at atmospheric pressure. The system 1 comprises furthermore a transporting pipe 7 connecting an outlet 9 of the first vessel 3 (the outlet is possibly the outlet of a discharger if a discharger is included in the first vessel) with an inlet 11 of the second vessel 5 for transporting the biomass material from the first vessel 3 to the second vessel 5.

Usually a so-called blow valve 13 is provided in the transporting pipe 7 (often called a blow line) close to the outlet 9 from the first vessel 3. The blow valve is provided for controlling the flow of biomass material and steam in the transporting pipe 7. In this invention description such a valve providing a control of the flow is called a restriction.

According to the invention the transporting pipe 7 comprises at least one restriction 13 for control of the flow in the transporting pipe. In the embodiment shown in FIG. 1 two restrictions 13, 15 are shown, a first restriction 13 and a second restriction 15, however, in another embodiment only one restriction 13 is provided or more than two restrictions can be provided which will be further described below. According to the invention at least one restriction, here the first restriction 13, is provided somewhere in the second half of the length of the transporting pipe 7 starting from the first vessel 3 and ending at the second vessel 5. A restriction which is controlling the flow in the transporting pipe can for example be a control valve by which the degree of flow restriction can be controlled or a fixed orifice plate. Such a restriction will hereby provide a pressure drop to the transported biomass material. The pressure drop will give the biomass material which is passing the restriction an increased velocity. In fact, in prior art systems the increased velocity caused by the second restriction 15, called the blow valve, provided close to the outlet from the first vessel 3, can as described above in the background cause big problems with erosion in the transporting pipe 7. According to the invention at least a part of this pressure drop is moved to a second half of the transporting pipe 7. Hereby the velocity of the biomass material upstream of the restriction in the transporting pipe 7 will be lower and erosion in this part of the transporting pipe 7 will decrease. Furthermore, erosion is a larger problem in bends of the transporting pipe because the biomass material will impinge specific parts of the walls of the transporting pipe close to bends. Hereby, if at least one restriction 13 is positioned after a majority of bends provided in the transporting pipe 7 from the first vessel 3 to the second vessel 5, or in one example after all bends provided in the transporting pipe 7 from the first vessel 3 to the second vessel 5, erosion in the transporting pipe 7 can be even more decreased, i.e. life time of the transporting pipe 7 will be increased.

In the embodiment shown in FIG. 1 the system 1 comprises a first restriction 13 and a second restriction 15. The second restriction 15 is positioned in connection with the outlet 9 from the first vessel 3 and can also be called a blow valve 15. When comparing to prior art systems the second restriction 15 will in this invention be controlled to provide a smaller pressure drop over the restriction. This is because the rest of the pressure drop will be provided by the first restriction 13 which is provided closer to the second vessel 5 according to the invention.

In another embodiment of the invention, only one restriction is provided, i.e. the first restriction 13 and the second restriction (the blow valve) 15 can be omitted.

Furthermore, in still another embodiment of the invention, more than two restrictions could be provided distributed in the transporting pipe 7.

In order to minimize erosion of the transporting pipe 7 as much as possible it could be suitable to position the first restriction 13 as close as possible to the second vessel 5, or at least somewhere in the last 25% or last 10% of the length of the transporting pipe 7 starting from the first vessel 3 and ending at the second vessel 5.

Furthermore, in the embodiment of the system as shown in FIG. 1 a diffuser 21 is provided connected to the inlet 11 of the second vessel 5. The transporting pipe 7 is hereby connected to the second vessel 5 through the diffuser 21. The first restriction 13 can be provided close to the diffuser or even connected to the diffuser 21. However, the first restriction 13 can also be provided at a distance upstream of the diffuser 21. Such a diffuser will decrease the velocity of the steam and particles (biomass, sand or other impurities) when entering the second vessel 5 which may be suitable for avoiding erosion of the second vessel 5. However, a diffuser is not necessary for the invention and the first restriction 13 does not need to be connected to a diffuser or provided close to a diffuser.

According to the invention a transporting pipe 7 configured for connecting an outlet 9 of a first vessel 3 with an inlet 11 of a second vessel 5 in a system for treatment of a biomass material as described above in relation to FIG. 1 is also provided.

Furthermore, a gas separation system 23 is also provided according to one aspect of the invention. Such a gas separation system 23 can be illustrated by the second vessel 5 together with the diffuser 21 which is connected to the inlet 11 of the second vessel 5. The second vessel can as described above be a gas separation device. According to this aspect of the invention, a restriction 13 is provided to the diffuser 21. The restriction 13 is arranged for connecting to a transporting pipe 7 which is connecting a pressurized reactor (first vessel 3) to the gas separation system 23. The restriction 13 is configured for control of a flow of a biomass material entering the gas separation system 5 from the transporting pipe 7 hereby providing a pressure drop to the transported biomass material.

Furthermore, a diffuser 21 is provided according to one aspect of the invention. Said diffuser 21 is also shown in FIG. 1 and is configured for connecting an inlet 11 of a second vessel 5 with a transport pipe 7 which is transporting biomass material from a first vessel 3 where said biomass material is treated by steam under a first pressure to the second vessel 5 where said biomass material is collected under a second pressure which is lower than said first pressure. According to this aspect of the invention, said diffuser 21 comprises a restriction 13 which is configured for control of a flow of the biomass material entering the second vessel 5 from the transporting pipe 7 hereby providing a pressure drop to the transported biomass material.

Figure 2:
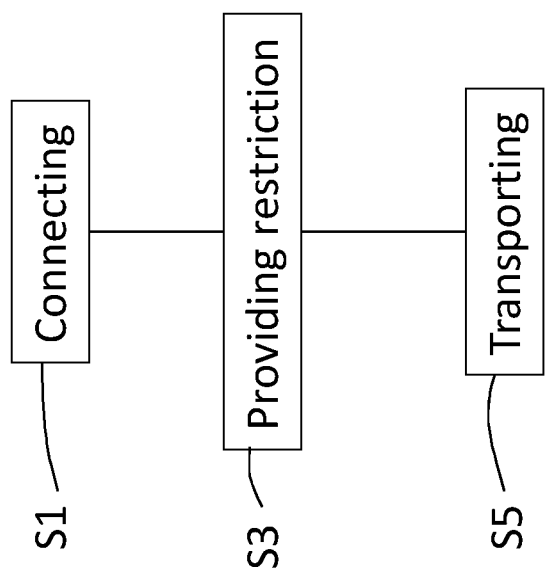
FIG. 2 is a flow chart of a method according to one embodiment of the invention.

A method for transporting a biomass material from a first vessel 3 where said biomass material is treated by steam under a first pressure to a second vessel 5 in which said biomass material is collected at a second pressure which is lower than the first pressure is also provided according to the invention. A flow chart of the method is shown in FIG. 2. Said method comprises the steps of:

S1: Connecting an outlet 9 of the first vessel 3 with an inlet 11 of the second vessel 3 by a transporting pipe 7.

S3: Providing at least one restriction 13 in the transporting pipe 7 for control of the flow in the transporting pipe hereby providing a pressure drop to the transported biomass material, wherein at least one of said at least one restriction 13 is provided somewhere in the second half of the length of the transporting pipe 7 starting from the first vessel 3 and ending at the second vessel 5. Or as described above said restriction can in one embodiment be provided somewhere in the last 25% or last 10% of the length of the transporting pipe 7 starting from the first vessel 3 and ending at the second vessel 5. Furthermore, at least one of said at least one restriction 13 can in one embodiment be provided after a majority of bends, or after all the bends provided in the transporting pipe 7 from the first vessel 3 to the second vessel 5.

S5: Transporting the biomass material from the first vessel 3 to the second vessel 5 through the transporting pipe 7.

In one embodiment of the invention the step S1 of the method further comprises providing a diffuser 21 between the second vessel 5 and the transporting pipe 7. The first restriction 13 can in this embodiment be provided in connection with said diffuser 21.

The invention claimed is:

1. A system for treatment of a biomass material, said system comprising:
a first vessel configured to treat the biomass material at a first pressure, wherein the first vessel is a reactor for pretreatment of a biomass material with steam or other heating media, and wherein the first vessel comprises an outlet configured to output the treated biomass material;
a transporting pipe configured to receive the entirety of the biomass material that has been treated in the first vessel;
a second vessel configured to receive the biomass material that has been treated in the first vessel and has been transported through the transporting pipe, the second vessel comprising an inlet; wherein:
the transporting pipe comprises a first restriction and a second restriction configured to control a flow in the transporting pipe and thereby provide a pressure drop to the biomass material transported through the transporting pipe; and
the first restriction is located in a second half of a length along which the biomass material travels starting from the outlet of the first vessel and ending at the inlet of the second vessel, and the second restriction is provided as a valve in connection with the outlet of the first vessel.

2. The system according to claim 1, wherein the first restriction is located in the last 25% of the length of the transporting pipe starting from the outlet of the first vessel and ending at the inlet of the second vessel.

3. The system according to claim 1, wherein the first restriction is located in the last 10% of the length starting from the outlet of the first vessel and ending at the inlet of the second vessel.

4. The system according to claim 1, further comprising:
a diffuser connected to an inlet of the second vessel and connecting the transporting pipe to the second vessel; wherein:
the first restriction is connected to said diffuser; and
the length along which the biomass material travels starting from the outlet of the first vessel and ending at the inlet of the second vessel includes a length of the transporting pipe and a length of the diffusor.

5. The system according to claim 1, wherein the first restriction is located after a majority of bends, elbows and junctions provided in the transporting pipe in a direction from the first vessel toward the second vessel.

6. The system according to claim 1, wherein the second vessel is a gas separation device.

7. A method for treating and transporting a biomass material, the method comprising:
providing a system comprising:
a first vessel configured to treat the biomass material at a first pressure, wherein the first vessel comprises an outlet configured to output the treated biomass material;
a transporting pipe configured to receive the entirety of the biomass material that has been treated in the first vessel;
a second vessel configured to receive the biomass material that has been treated in the first vessel and has been transported through the transporting pipe, the second vessel comprising an inlet; wherein:
the transporting pipe comprises a first restriction and a second restriction configured to control a flow in the transporting pipe and thereby provide a pressure drop to the biomass material transported through the transporting pipe; and
the first restriction is located in a second half of a length along which the biomass material travels starting from the outlet of the first vessel and ending at the inlet of the second vessel, and the second restriction is provided as a valve in connection with the outlet of the first vessel;

pre-treating the biomass material with steam or other heating media in the first vessel under a pressure of at least 5 bar(g) and a temperature of at least 130° C.; and transporting the biomass material from the first vessel to the second vessel through the transporting pipe.

8. The method according to claim 7, wherein the first restriction is located in the last 25% of the length starting from the outlet of the first vessel and ending at the inlet of the second vessel.

9. The method according to claim 7, wherein the first restriction is located in the last 10% of the length starting from the outlet of the first vessel and ending at the inlet of the second vessel.

10. The method according to claim 7, wherein:
the system further comprises a diffuser connected to an inlet of the second vessel and connecting the transporting pipe to the second vessel; wherein:
the first restriction is connected to said diffuser; and
the length along which the biomass material travels starting from the outlet of the first vessel and ending at the inlet of the second vessel includes a length of the transporting pipe and a length of the diffusor.

11. The method according to claim 7, wherein the first restriction is located after a majority of bends, elbows and junctions provided in the transporting pipe in a direction from the first vessel toward the second vessel.

12. A system according to claim 1, wherein:
an upstream end of the transporting pipe is directly attached to the outlet of the first vessel;
a downstream end of the transporting pipe is directly attached to the inlet of the second vessel; and
the length along which the biomass travels starting from the outlet of the first vessel and ending at the inlet of the second vessel is a length of the transporting pipe.

* * * * *

UNITED STATES PATENT AND TRADEMARK OFFICE
CERTIFICATE OF CORRECTION

| | | |
|---|---|---|
| PATENT NO. | : 12,098,505 B2 | Page 1 of 1 |
| APPLICATION NO. | : 17/050013 | |
| DATED | : September 24, 2024 | |
| INVENTOR(S) | : Olof Melander, Patrik Pettersson and Johan Carlsson | |

It is certified that error appears in the above-identified patent and that said Letters Patent is hereby corrected as shown below:

In the Claims

Claims 2, Column 7, Lines 4-5:
Delete:
"restriction is located in the last 25% of the length of the transporting pipe starting from the outlet of the first vessel."

Replace with:
"restriction is located in the last 25% of the length starting from the outlet of the first vessel."

Signed and Sealed this
Seventeenth Day of December, 2024

Derrick Brent
*Acting Director of the United States Patent and Trademark Office*